E. B. WILLIAMSON.
LUMBER TRIMMING MACHINE.
APPLICATION FILED APR. 7, 1915.

1,175,855.

Patented Mar. 14, 1916.
2 SHEETS—SHEET 1.

Attest:
E. M. Hamilton
Ewd R. Tolson

Inventor:
Edward B. Williamson

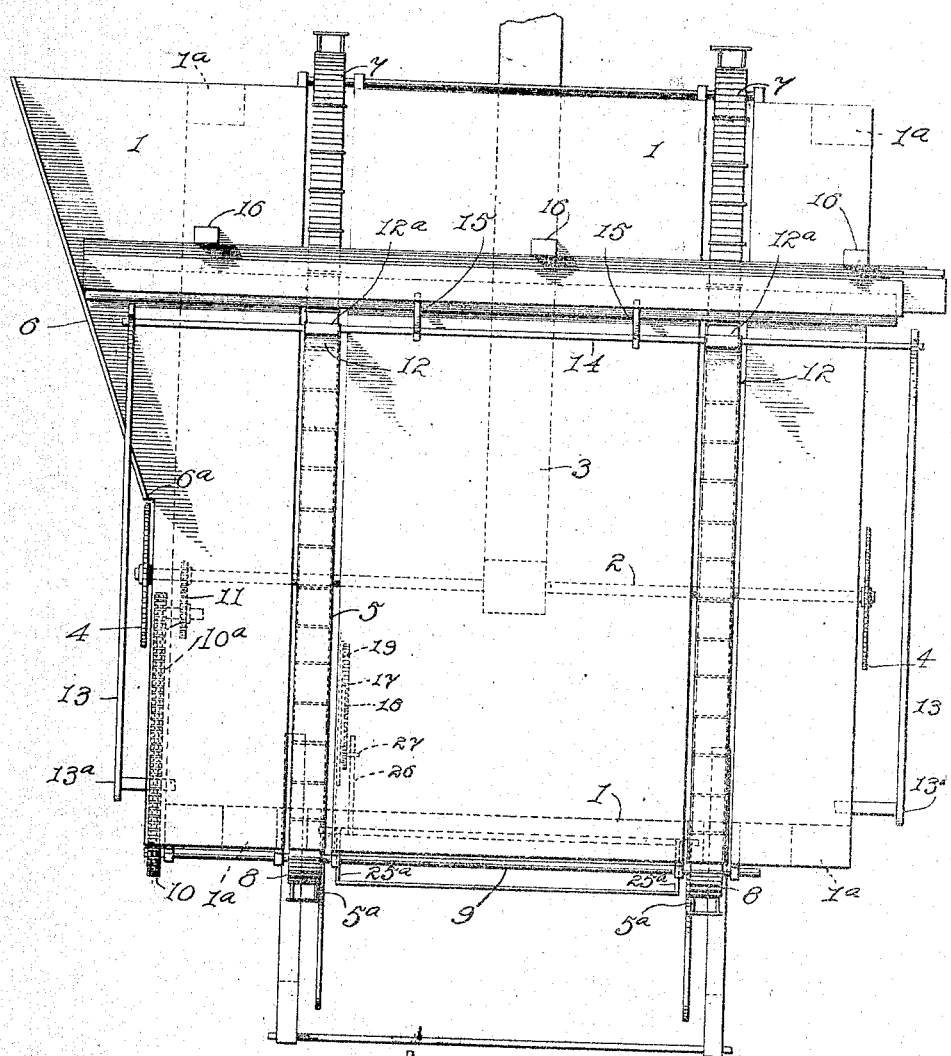

UNITED STATES PATENT OFFICE.

EDWARD BLAND WILLIAMSON, OF ESTILL, SOUTH CAROLINA.

LUMBER-TRIMMING MACHINE.

1,175,855.  Specification of Letters Patent.  Patented Mar. 14, 1916.

Application filed April 7, 1915. Serial No. 19,742.

*To all whom it may concern:*

Be it known that I, EDWARD B. WILLIAMSON, citizen of the United States, residing at Estill, South Carolina, have invented certain new and useful Improvements in Lumber-Trimming Machines, of which the following is a specification.

My present invention relates to improvements in lumber trimming machines, and has among its objects to provide a simple, economical, and efficient apparatus for automatically trimming, counting and piling pickets, laths, copper sticks, wooden strips used between copper plates, and similar articles.

Figure 1:
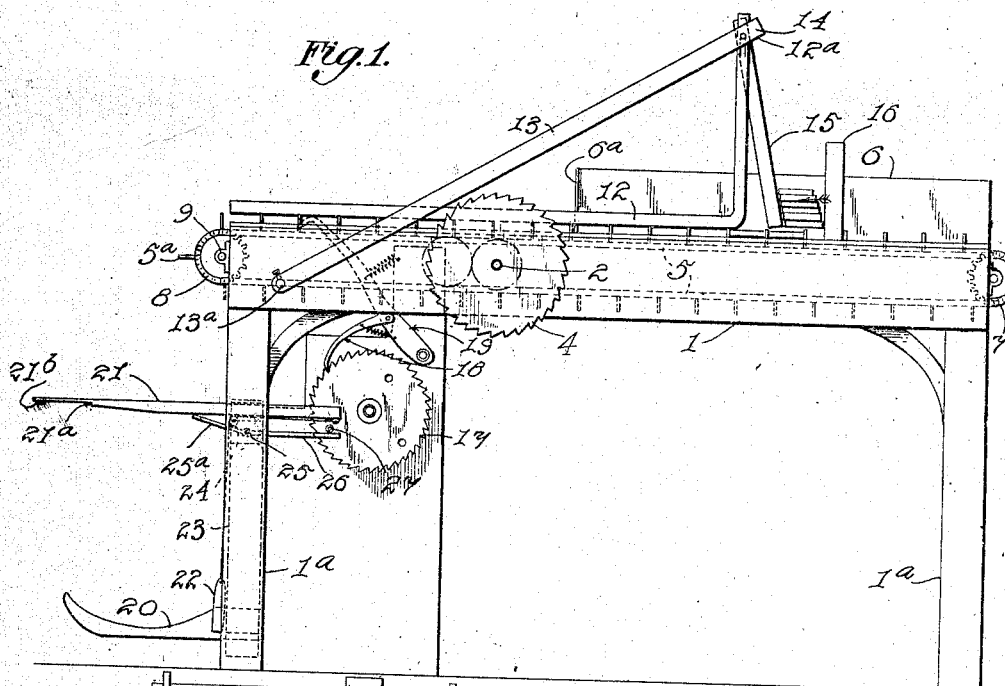
Figure 2:
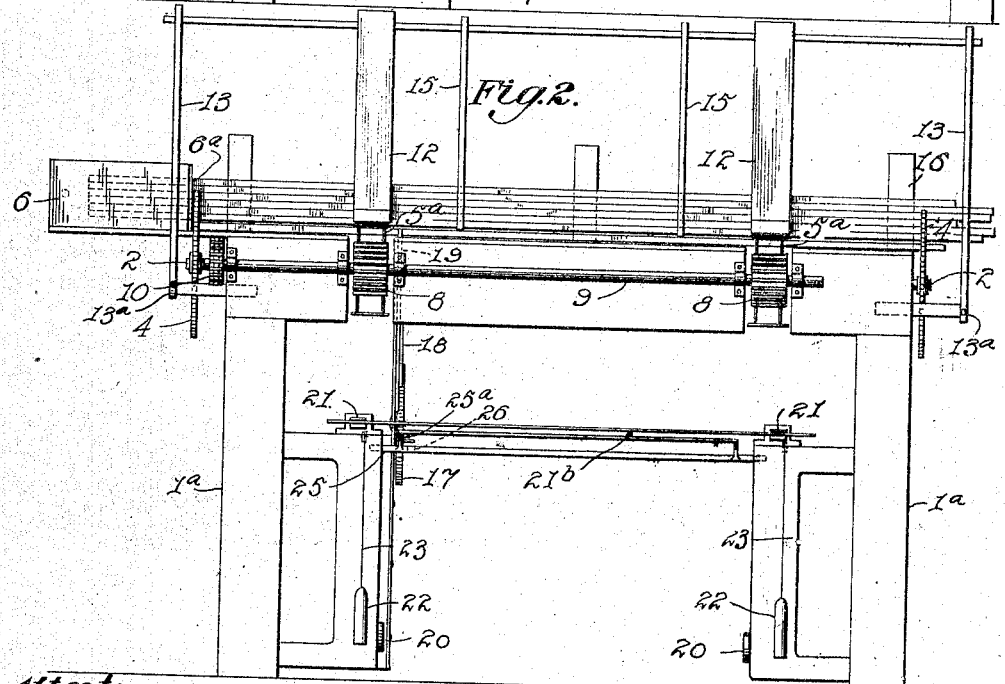

The invention includes the novel features of construction and arrangement and combination of parts as defined by the appended claims, an embodiment of my invention being illustrated in the accompanying drawings, in which, Figure 1 is a side elevation. Fig. 2 is a view of the rear or delivery end. Fig. 3 is a plan view, and Fig. 4 is a detail view on a slightly larger scale.

Referring by reference characters to these drawings, the numeral 1 designates a suitable frame supported by suitable standards 1ª, 1ª. Journaled in this frame is a saw shaft 2 driven by suitable means such as a belt 3 from any convenient source of power (not shown). This shaft carries a pair of saws 4 located a distance apart corresponding to the length of picket or other article to be trimmed.

The pickets are fed to the saws by endless chains or conveyers 5 having projections or flights 5ª to engage the pickets and convey them from the point of feed to the delivery side of the machine.

In order that the ends of the pickets at one side of the machine may be all brought into alinement, I provide the frame at one side with an inclined guide wall 6, which, as the pickets or other articles are carried sidewise in the direction of the arrow, Fig. 1, toward the saws, will cause them to be moved endwise toward the right until the left hand end clears the front portion 6ª of the guide wall.

The conveyer passes around sprocket wheels or pulleys 7 at the feed end of the machine, and around driving wheels or sprockets 8 at the delivery end. These sprockets 8 are fast on a shaft 9 which is driven by suitable means, which may be independent means, or connections, such as chain and sprocket connection 10 and 10ª and speed reducing and reversing gearing 11.

In order to prevent the pickets from jumping out from between the flights, I provide floating presser bars 12 which rest upon the upper faces of the slats. These bars are held in position by the arms or brackets 13 connected to the frame at 13ª and having their opposite ends connected to a shaft or rod 14 which passes through slots in the upright or bracket portions 12ª on the bars 12. The bars 12 are thus gravity held or floating bars. They accommodate themselves to varying thicknesses of material, while more than one strip is prevented from passing beneath the bars at the same time by the depending arms 15 which are adjustably connected to the rod or bar 14 so as to be adjustable for varying thicknesses of lumber.

The supply of articles to be trimmed is placed between these arms and the posts 16, as indicated in Fig. 1. As the slats or pickets pass the saws and are trimmed thereby at both ends, they are counted or their number indicated by a suitable counting device which may take the form of a ratchet wheel 17 operated by a spring pressed pawl 18 pivoted to a spring pressed lever 19 which has its upper end projected into position to be depressed by each successive article, thus moving the ratchet wheel an amount equal to one tooth. A suitable pressure spring or brake device may be caused to bear with frictional contact on the ratchet wheel to keep it from moving too freely or too far by momentum. The ratchet wheels may also be made removable so that they may be removed and replaced by others having a greater or less number of teeth. As the trimmed articles are delivered from the endless chains or carriers they drop onto the receiving arms 20, from which they may be removed in bundles and bound up in any suitable manner.

In order that the bundles may all contain an equal number of articles, I provide means for interrupting the delivery of the articles onto the arms 20 as soon as a predetermined amount have been collected thereon. Such interrupting or intercepting device may take the form of a pair of connected bars 21 slidably supported by the standards at the delivery end of the frame, and adapted to be automatically projected into the position shown in Figs. 1 and 3 by means of weights 22 connected thereto by cords or chains 23 passing over pulleys 24.

The bars are held in retracted position so as not to interfere with the dropping of the articles onto the arms 20 by providing the bars 21 with shoulders 21ª which drop behind lugs on the guides when the bars are retracted. For releasing or unlocking the bars as soon as the desired number of articles has collected on the arms 20 I provide a lever pivoted to the machine at 25 and having an arm 26 adapted to be depressed by a pin 27 on the counting or ratchet wheel 17. When the end 26 of said lever is so depressed the front end 25ª is raised and bearing on connecting or cross bar 21ᵇ, lifts the bars 21 until their shoulders 21ª are disengaged from the projections of the guides, and the bars are free to be projected by the pull of the weights.

Additional holes may be provided for the reception of additional pins so that bundles of different sizes may be formed if desired.

Means may be provided whereby the distance of the saws apart may be varied to accommodate the machine to different lengths of articles.

I claim as my invention:

In a device of the class described, the combination with an endless conveyer for articles and a collecting and counting device situated at one end of and below the level of said conveyer; of mechanism for interrupting the delivery of the articles to said collecting device comprising a pair of connected, horizontally slidable bars, a pivoted lever associated with said bars to normally hold them in retracted position, said lever being operatively connected with said counting device, and a pair of swinging weights tending to slide said bars outwardly, whereby upon delivery of a predetermined number of articles the pivoted lever is automatically released by the counting device and the bars are slid horizontally forward to interrupt the delivery of any more articles from the conveyer to the collecting device.

In testimony whereof, I affix my signature in presence of two witnesses.

EDWARD BLAND WILLIAMSON.

Witnesses:
J. W. CAREY,
CHAS. E. MORRIS.